(12) United States Patent
Wen et al.

(10) Patent No.: US 6,352,328 B1
(45) Date of Patent: *Mar. 5, 2002

(54) DIGITAL INK JET PRINTING APPARATUS AND METHOD

(75) Inventors: Xin Wen, Rochester; Rodney L. Miller, Fairport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/899,574

(22) Filed: Jul. 24, 1997

(51) Int. Cl.[7] .................................................. B41J 2/205
(52) U.S. Cl. .......................................... 347/15; 347/11
(58) Field of Search .............................. 347/10, 11, 15

(56) References Cited

U.S. PATENT DOCUMENTS

| | | | |
|---|---|---|---|
| 4,513,299 A | | 4/1985 | Lee et al. |
| 4,680,596 A | * | 7/1987 | Logan ........................... 347/15 |
| 4,686,539 A | | 8/1987 | Schmidle et al. |
| 4,714,935 A | | 12/1987 | Yamamoto et al. |
| 4,959,659 A | | 9/1990 | Sasaki et al. |
| 5,051,844 A | | 9/1991 | Sullivan |
| 5,138,333 A | | 8/1992 | Bartky et al. |
| 5,202,659 A | | 4/1993 | DeBonte et al. |
| 5,214,517 A | | 5/1993 | Sullivan et al. |
| 5,291,311 A | | 3/1994 | Miller |
| 5,305,024 A | * | 4/1994 | Moriguchi et al. ............ 347/11 |
| 5,361,084 A | | 11/1994 | Paton et al. |
| 5,436,648 A | | 7/1995 | Stortz et al. |
| 5,461,403 A | | 10/1995 | Wallace et al. |
| 5,557,304 A | | 9/1996 | Stortz |
| 5,586,203 A | | 12/1996 | Spaulding et al. |
| 5,610,637 A | | 3/1997 | Sekiya et al. |
| 5,736,993 A | * | 4/1998 | Regimbal et al. .............. 347/11 |
| 5,912,679 A | * | 6/1999 | Takayama et al. ............. 347/10 |
| 5,975,672 A | * | 11/1999 | Wen .............................. 347/15 |
| 6,046,822 A | * | 4/2000 | Wen et al. .................. 347/15 X |
| 6,064,410 A | * | 5/2000 | Wen et al. |
| 6,079,806 A | * | 6/2000 | Wen et al. ..................... 347/10 |
| 6,102,513 A | * | 8/2000 | Wen .............................. 347/15 |
| 6,109,732 A | * | 8/2000 | Wen .......................... 347/15 X |

OTHER PUBLICATIONS

Robert Ulichney, "Digital Halftoning", 1987 Massachusetts Institute of Technology; Fourth printing 1993, Chapter 8, pp. 238–243.

* cited by examiner

Primary Examiner—Susan S. Y. Lee
(74) Attorney, Agent, or Firm—Walter S. Stevens (57) ABSTRACT

Digital ink jet printing apparatus and method. The apparatus receives an input image file having a plurality of pixels, each pixel described by at least one pixel value respectively associated with an optical density. The apparatus comprises a printhead and at least one nozzle integrally attached to the printhead, the nozzle being capable of ejecting an ink droplet therefrom to define an associated one of the optical densities. A waveform generator is connected to the nozzle for generating an electronic waveform to be supplied to the nozzle. In this manner, the nozzle ejects the ink droplet in response to the waveform supplied thereto. The waveform is defined by a plurality of pulses. A look-up table stores a plurality of waveform serial numbers assigned to respective waveforms, each waveform being defined by at least one predetermined parameter, such as number of pulses, pulse amplitude, pulse width and/or time delay between pulses. A calibrator receiving the input image converts the pixel values of the input image to waveform index number associated with the waveform serial number.

30 Claims, 6 Drawing Sheets

| WAVEFROM SERIAL NUMBER (SNi) | PRINT DENSITY (Di) | 1st PULSE | | | 2st PULSE | | |
|---|---|---|---|---|---|---|---|
| | | $A_1$ | $W_1$ | $S_{1-2}$ | $A_2$ | $W_2$ | $S_{2-3}$ |
| $SN_1$ | D1 | 1 | 1 | N/A | 1 | 1 | N/A |
| $SN_2$ | D2 | 1 | 1 | 1 | 1 | 0.8 | ... |
| $SN_3$ | D3 | ... | ... | ... | ... | ... | ... |
| $SN_4$ | D4 | | | | | | |
| ... | ... | | | | | | |
| $SN_N$ | Dmax | | | | | | |

DIGITAL INK JET PRINTING APPARATUS AND METHOD

CROSS REFERENCE TO RELATED APPLICATIONS

The present application is related to commonly-owned U.S. patent application Ser. No. 08/826,357 titled "Imaging Apparatus and Method Adapted to Control Ink Droplet Volume and Void Formation" filed Mar. 26, 1997, in the name of Xin Wen and commonly-owned and concurrently applied for U.S. patent application Ser. No. 08/899,616, U.S. Pat. No. 5,975,672,titled "Ink Jet Printing Apparatus And Method Accommodating Printing Mode Control" filed Jul. 24, 1997, in the name of Xin Wen.

FIELD OF THE INVENTION

The present invention generally relates to image printing apparatus and methods, and more particularly to a digital ink jet printing apparatus and method for variable gray scale printing on a receiver medium in such a manner that "quantization errors", visible noise, excessive ink laydown and printing time are reduced.

BACKGROUND OF THE INVENTION

An ink jet printer produces images on a receiver medium by ejecting ink droplets onto the receiver medium in an imagewise fashion. The advantages of non-impact, low-noise, low energy use, and low cost operation and the capability of the printer to print on plain paper are largely responsible for the wide acceptance of ink jet printers in the marketplace.

However, a disadvantage associated with ink jet printers is that ink is ejected in discrete ink droplet(s); therefore, ink jet printers only print discrete ink dots and at discrete optical density levels. Hence, unintended and extraneous ink dots, which are most visible in low-density areas of the image on the receiver medium, give rise to undesirable image artifacts. Furthermore, due to the optical densities being discrete, an input digital image with substantially continuous or high bit-depth pixel values are typically "quantized" to the available density values in the ink jet printer apparatus. However, when pixel values are quantized, "quantization errors" occur. These quantization errors often produce image artifacts that appear to the viewer of the image as posterization or contouring. Although quantization errors can be reduced by increasing the available levels of optical densities, reduction of quantization errors increase printing time and ink laydown. Increased ink laydown on the receiver medium requires higher liquid absorption by the receiver medium, which is undesirable.

Methods for increasing available levels of optical densities have been disclosed in the prior art. A method to increase available levels of optical densities is disclosed in U.S. Pat. No. 4,714,935. According to this patent, the volume of an ejected ink droplet is varied by modulating the electronic waveforms that activate ink drop formation and ejection. Individual droplets are ejected from an ink jet nozzle and land separately on a receiver medium. This patent also discloses that ink volume can be modulated by a single electric pulse, or by a plurality of electric pulses which increase the control dynamic range.

U.S. Pat. No. 4,513,299 discloses an alternative approach for increasing available levels of optical densities. According to this patent, a plurality of electric pulses are used to produce a plurality of ink droplets that are ejected from an ink nozzle and merge together into one droplet before arriving at a receiver medium.

In U.S. Pat. No. 5,610,637, more than one ink droplet is placed at a pixel location on the receiver medium so that an ink dot of variable diameter is formed on the receiver medium.

Disadvantages of the techniques disclosed in U.S. Pat. Nos. 4,714,935, 4,513,299 and 5,610,637 are the increased printing time and increased ink laydown on the receiver medium. As previously mentioned, increased ink laydown on the receiver medium requires higher liquid absorption by the receiver medium, which is undesirable.

U.S. Pat. No. 4,959,659 discloses yet another approach for increasing available levels of optical densities. According to this patent, a plurality of inks of different densities for each color are deposited on a receiver medium. Thus, an increase in printable ink densities is obtained by an increased number of available ink densities for each color. In addition, this method allows a plurality of ink droplets to be printed at each pixel location on the receiver medium thereby resulting in increased ink laydown. The disadvantages associated with this approach are the increased complexity and cost for the increased number of inks and ink cartridges in the printer. Another disadvantage of this method is that it also results in increased ink laydown.

The techniques disclosed by the art recited hereinabove print discrete ink droplets, and hence do not eliminate artifacts caused by quantization errors and extraneous visible discrete dots in the printed image. Therefore, problems associated with the art are quantization errors, increased ink laydown and excessive printing time.

Another problem associated with prior art ink jet printers is image artifacts and visible noise caused by manufacturing variability among the plurality of ink jet nozzles comprising a printhead. More specifically, variability in the print head fabrication process produces variability in the nozzles (e.g., variability in the size of nozzle orifices) comprising the printhead, which in turn causes undesirable variability in ink droplet volume for droplets ejected from the nozzles. As a result, some nozzles print higher densities than other nozzles. Such variability causes visible noise or image artifacts, such as banding or streaks, along the movement direction of the print head relative to the receiver medium. To reduce such visible image artifacts, typical prior art ink jet printers print in multiple shingled passes over the same image area so that each image location on the receiver medium is printed by different nozzles in each pass. In this case, print variability between nozzles is averaged out and the visual artifacts appear reduced. However, a disadvantage of this technique is that print time is greatly increased by a factor approximately equal to the number of passes.

Therefore, there has been a long-felt need to provide a digital ink jet printing apparatus and method for variable gray scale printing on a receiver medium in such a manner that "quantization errors", visible noise, excessive ink laydown and printing time are reduced.

SUMMARY OF THE INVENTION

The present invention resides in an ink jet printing apparatus adapted to receive an input image having a plurality of pixels, each pixel described by at least one pixel value respectively associated with an optical density. The apparatus comprises a printhead and at least one nozzle integrally attached to the printhead, the nozzle being capable of ejecting an ink droplet therefrom to define an associated one of the optical densities. A waveform generator is connected to the nozzle for generating an electronic waveform to be supplied to the nozzle, so that the nozzle ejects the ink droplet in response to the waveform supplied thereto. The waveform is defined by a plurality of pulses. A look-up table stores a plurality of waveform serial numbers assigned to respective waveforms, each waveform being defined by at least one predetermined parameter. A calibrator for converting the pixel values of the input image to waveform index number associated with the waveform serial number.

An object of the present invention is to provide an ink jet printer capable of reducing visible noise and image artifacts caused by extraneous discrete ink drops.

Another object of the present invention is to provide an ink jet printer capable of reproducing digital images of continuous tone for gray-scaling.

Still another object of the present invention is to reduce quantization errors.

A further object of the present invention is to provide an ink jet printer wherein printing time is reduced.

Yet another object of the present invention is to provide a suitable technique allowing selection of any one of a plurality of electronic waveforms for driving the ink jet printhead.

A feature of the present invention is the provision of a look-up table that includes electronic waveforms with respective waveform serial numbers and corresponding to desired printed optical densities, the electronic waveforms being capable of driving the print head.

Another feature of the present invention is the provision of a calibration unit in which each pixel of an image file is converted to waveform index numbers associated with waveform serial numbers.

An advantage of the present invention is that quantization errors are reduced.

Another advantage of the present invention is that visible noise caused by manufacturing variabilities among printhead nozzles is reduced.

A further advantage of the present invention is that excessive ink laydown is reduced.

Yet another advantage of the present invention is that printing time is reduced.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the present invention, it is believed the invention will be better understood from the following description when taken in conjunction with the accompanying drawings wherein:

DETAILED DESCRIPTION OF THE INVENTION

Figures 1A, 1A:
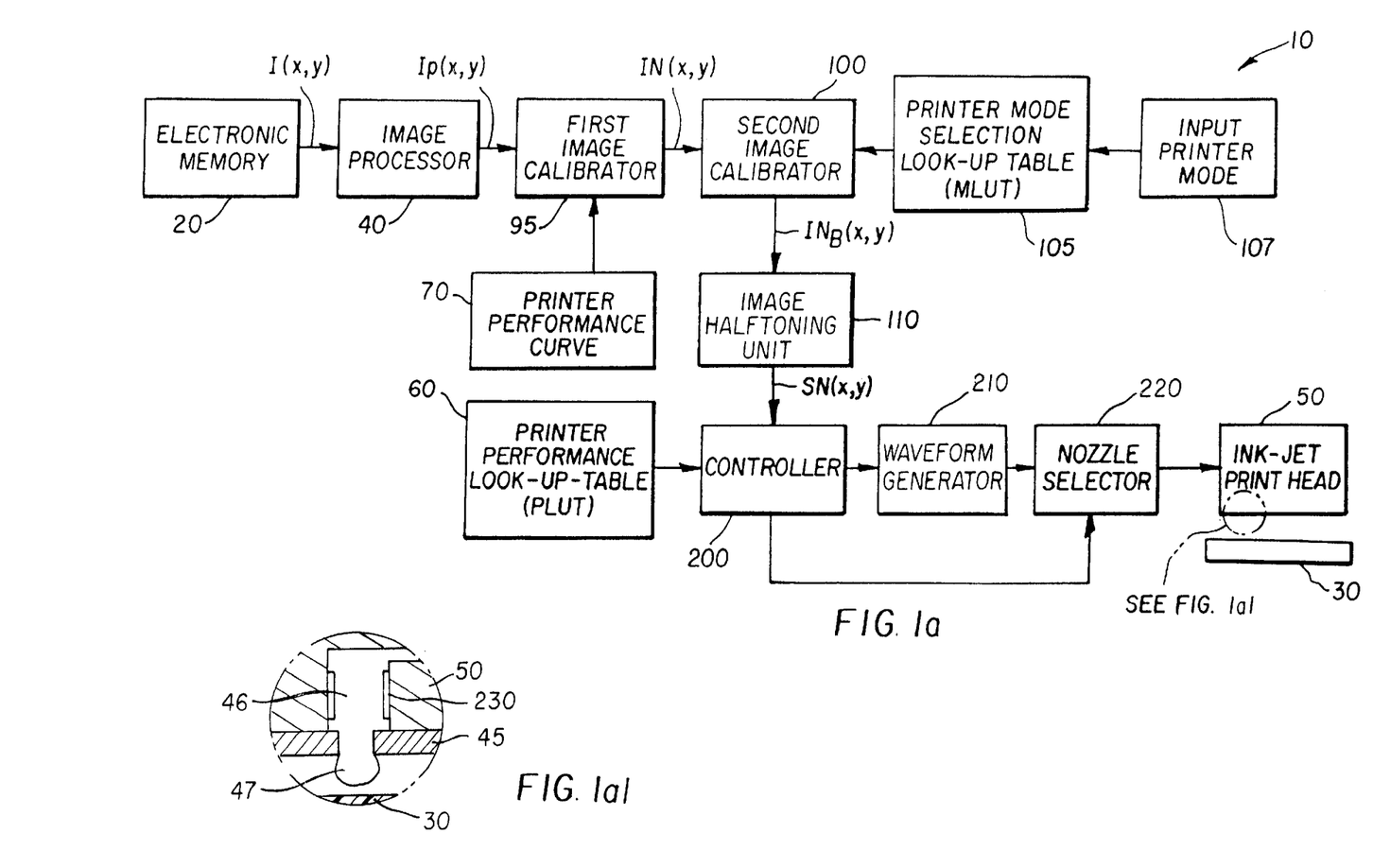
FIG. 1a shows a system block diagram belonging to the present invention, the diagram including a piezo-electric ink jet printhead, a printer performance curve, a printer performance LUT (Look-Up Table) and an image halftoning device.
Figures 1B, 1B:
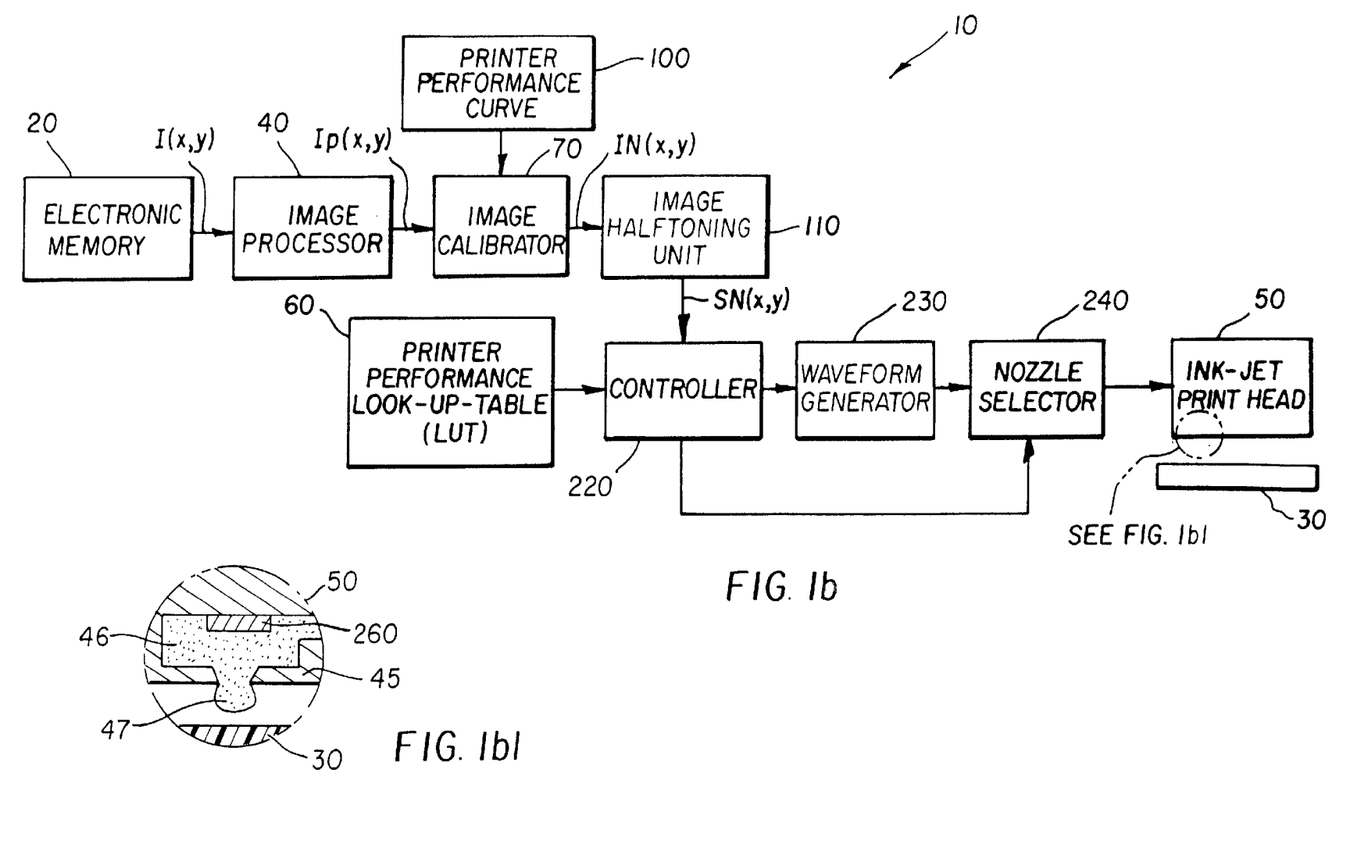
FIG. 1b shows a system block diagram belonging to the present invention, the diagram including a thermal ink jet printhead, a printer performance curve, a printer performance LUT (Look-Up Table) and an image halftoning device.

Referring to FIGS. 1a and 1b, a system block diagram, generally referred to as 10, includes an electronic memory 20 having a digital image file I(x,y) stored therein. With respect to image file I(x,y), the letters "x" and "y" designate column and row numbers, respectively, the combination of which define pixel locations in a plane of pixels (not shown). More specifically, a plurality of color pixels with pixel values at each "x" and "y" location correspond to desired color densities (i.e., "aim densities") when printed on a receiver medium 30. Image file I(x,y) may be generated by a computer or, alternatively, provided as an input generated from a magnetic disk, a compact disk, a memory card, a magnetic tape, a digital camera, a print scanner, a film scanner, or the like. Moreover, image file I(x,y) may be provided in any suitable format well known in the art, such as page-description language or bitmap format.

Still referring to FIGS. 1a and 1b, electrically connected to electronic memory 20 is an image processor 40, which processes image file I(x,y) such that image processor 40 is capable of performing any one of several desired operations on image file I(x,y). These operations may be, for example, decoding, decompression, rotation, resizing, coordinate transformation, mirror-image transformation, tone scale adjustment, color management, in addition to other desired operations. Image processor 40 generates an output image file $I_p(x,y)$, which includes a plurality of pixel values having color code values, the pixel values corresponding to respective ink delivery nozzles 45 (only one of which is shown) in an ink jet print head 50, each nozzle 45 having an ink chamber 46 for ejecting an ink droplet 47 therefrom.

Figure 2:
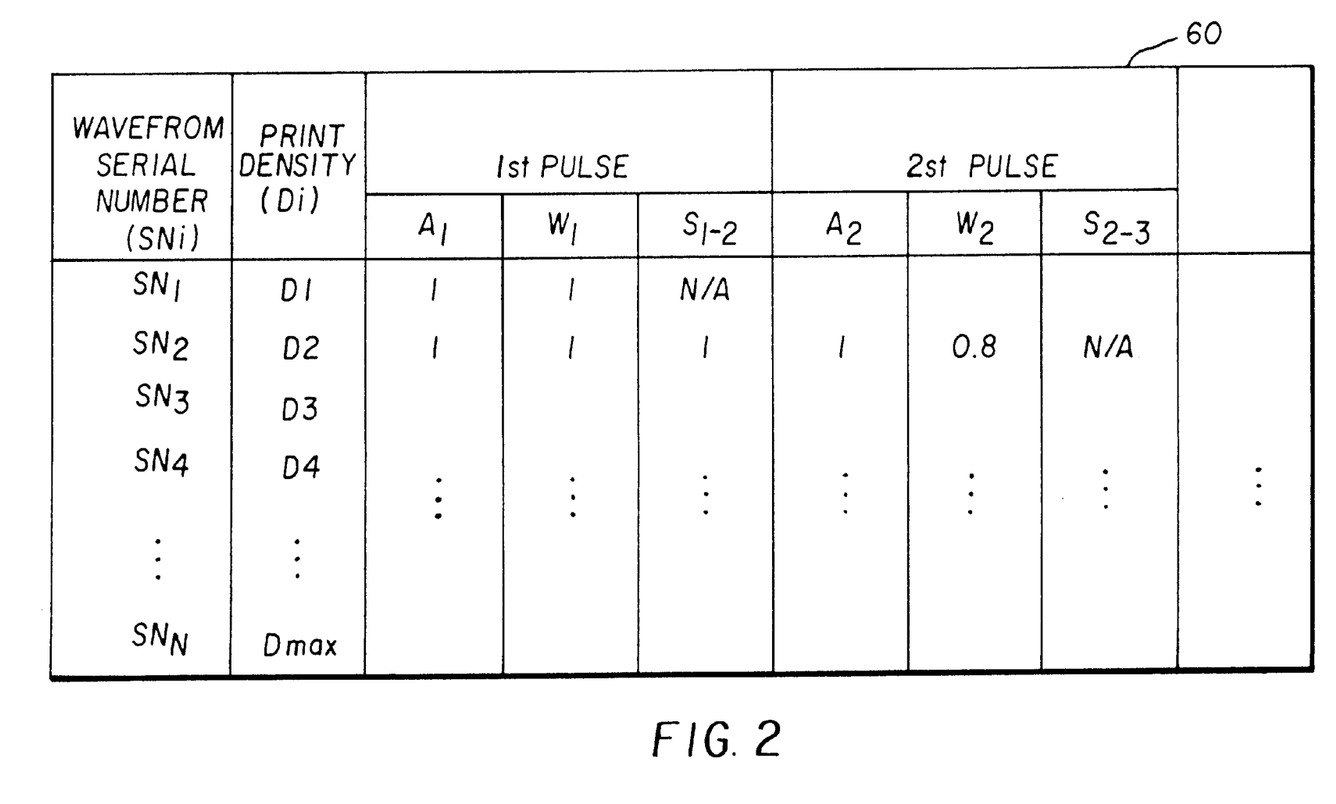
FIG. 2 shows an enlargement of the LUT of FIG. 1.
Figure 3:
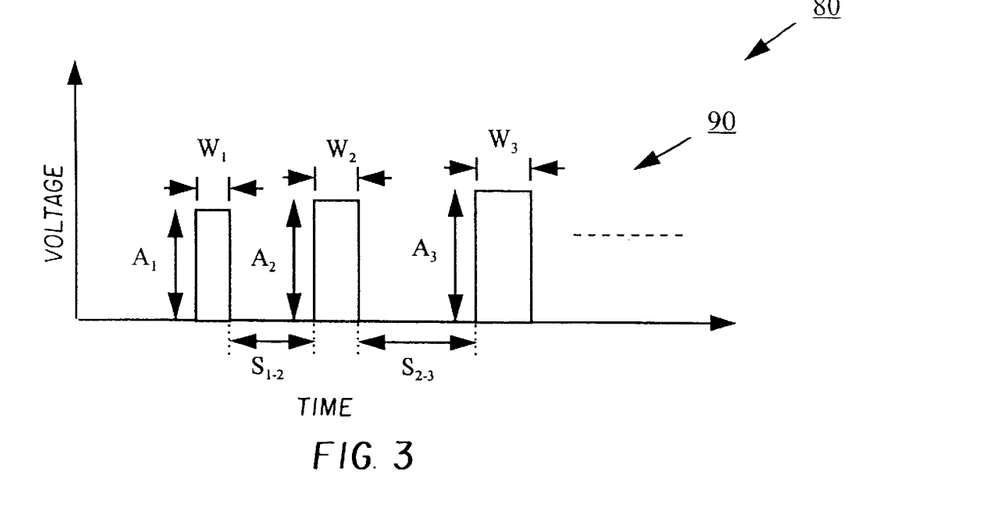
FIG. 3 is a graph illustrating an electronic waveform comprising a plurality or series of voltage pulses, the waveform being defined by predetermined parameters including number of pulses, pulse amplitude, pulse width, and delay time between pulses.
Figure 4:
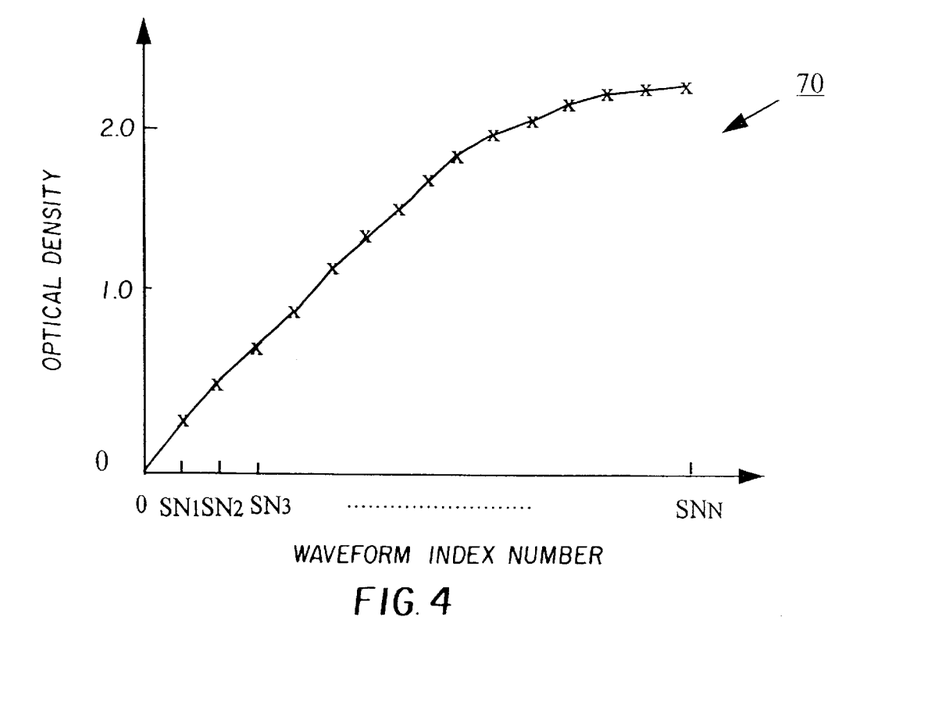
FIG. 4 is a graph illustrating the printer performance of FIG. 1.

Referring to FIGS. 1a, 1b, 2 and 3, data related to performance of apparatus 10 are stored in printer performance look-up table (LUT) 60 and a printer performance curve 100 (see FIG. 4). As shown in FIGS. 1, 2 and 3, image file $I_p(x, y)$ is calibrated in an image calibrator 70 which converts color pixel values at each pixel to waveform index numbers IN, as described more fully hereinbelow. LUT 60 provides an electronic waveform, generally referred to as 80, comprising a group of "square" pulses, generally referred to as 90 (only three of which are shown), for driving print head 50. Electronic waveform 80 is characterized by the number of square pulses, pulse widths (i.e., $W_1, W_2, W_3...$), voltage pulse amplitudes (i.e., $A_1, A_2, A_3...$), and delay time intervals (i.e., $S_{1-2}, S_{2-3}...$) between pulses 90. Predetermined values of pulse amplitudes, widths and delay time intervals between pulses are selected depending on a desired mode of operation of printhead 50. For example, a desired mode of operation for a piezoelectric ink jet print head 50 may be that frequencies of pulses 90 are reinforced by the resonance frequencies of an ink chamber 46, which is associated with each ink nozzle 45, so that energy cost for ink ejection is minimized. Predetermining the values of the number of pulses, pulse amplitude, pulse width and time delay between pulses results in discrete ink droplet volumes that are modulatable by electronic waveform 80. It is understood from the teachings herein that square pulses 90 are only an example of many possible electronic waveforms usable for driving print head 50. Alternative electronic waveforms usable with the present invention include, for example, triangular, trapezoidal, and sinusoidal waveforms, either in unipolar or bi-polar voltages. In addition, electronic waveform 80 may be fully or partially continuous without one or more delay time intervals ($S_{1-2}$, $S_{2-3}$...). Such waveforms can be characterized by predetermined parameters in similar fashion to the example of the square wave 90. For example, a continuous sinusoidal wave can be characterized by the period and the amplitude of each cycle or each half cycle plus a constant voltage offset.

Referring to FIGS. 2 and 3, LUT 60 includes a plurality of optical density values $D_i$ (i=1, ..., $D_{max}$) corresponding to a plurality of electronic waveforms, with each waveform being described by waveform serial numbers $SN_i$ (i=1, ..., N). As used herein, the terminology "optical density" refers to the reflective or the transmittance optical densities as measured by a densitometer (not shown) set in the well-known Status "A" or Status "M" mode, respectively. Such reflective and transmittance optical densities are measured from reflective (e.g., coated paper) and transmittance (e.g., transparent film) ink receivers. The density $D_i$ is measured from a uniform density patch of a test image, which is printed by driving the nozzles with the waveform corresponding to the waveform serial numbers $SN_i$. "N" is the total number of electronic waveforms in LUT 60 and "$D_{max}$" is the maximum achievable optical density. LUT 60 also includes the previously mentioned parameters, which characterize waveform 80. As previously mentioned, these parameters are the widths ($W_1$, $W_2$, $W_3$...), the amplitudes ($A_1$, $A_2$, $A_3$...), and the delay time intervals between pulses ($S_{1-2}$, $S_{2-3}$...). However, it is understood from the teachings herein that a different set of parameters will obtain for electronic waveforms other than the square waveform 80 shown in FIG. 3. In LUT 60, optical densities $D_1$, $D_2$, $D_3$... are tabulated as a monatomic function of waveform serial number SN for a predetermined electronic waveform 80 (e.g., square wave 90).

Moreover, still referring to FIGS. 2 and 3, it may be understood that the series of electronic waveforms $SN_i$ listed in LUT 60 are only a subset of all possible electronic waveforms capable of driving ink jet print head 50. However, it was discovered that, when printing with all possible electronic waveforms, many electronic waveforms result in equal or similar optical densities $D_i$. Only suitable ones of these waveforms need be selected and listed as the electronic waveforms in LUT 60. Such a selection is made by minimizing the gap or difference between any two optical densities $D_i$ and the corresponding two consecutive waveform serial numbers $SN_i$. Minimizing such gaps minimize quantization errors and thereby arrive at suitable waveforms.

Referring to FIG. 4, there is shown the printer performance curve 100 formed by plotting optical density as a function of waveform index number IN. To form printer performance curve 100, the N electronic waveforms in LUT 60 are used to print an image comprising uniform-density patches (not shown) from which optical densities are obtained for each waveform serial number SN corresponding to the waveform. The plurality of "x" symbols in FIG. 4 represent the data points obtained from LUT 60 corresponding to the SN's in LUT 60. The data points "x" are interpolated by techniques well known in the art to produce a continuous curve for expressing IN as a continuous variable. The difference between waveform serial number SN and waveform index number IN is as follows: waveform serial number $SN_i$ is a description of the discrete optical density levels (i.e., tones) that the ink jet printer is capable of producing. With respect to $SN_i$, the total level N ranges from 2 to 64 available levels, that is, 1 to 6 bit depth. The index number waveform IN represents substantially continuous tone. Of course, there should be higher than 8 bit levels ($2^8$), for example, 10–12 bits, used to describe the waveform index numbers IN.

Returning to FIGS. 1*a* and 1*b*, image file $I_p$(x,y) is calibrated by image calibrator 70. $I_p$(x,y) includes color pixel values for each of the yellow, magenta and cyan color planes. That is, each color code value is associated with an aim optical density for that color, as defined by the input image file I(x,y). The calibration performed by image calibrator 70 converts each color pixel value to a waveform index number IN using (a) the aim density at that pixel for that color and (b) printer performance curve 100 (see FIG. 4). This calibration process results in an image file IN(x,y) with pixel values described by waveform index numbers IN.

Still referring to FIGS. 1*a* and 1*b*, image halftoning unit 110 is used to minimize image artifacts. As used herein, the terminology "image halftoning" refers to the image processing technique which creates the appearance of intermediate tones by the spatial modulation of two tones, for example, black and white, or multiple levels of tones, such as black, white and gray levels. Halftoning improves image quality by minimizing image artifacts such as contouring and noise, both of which result from printing with a finite number of tone levels. In cases where multiple levels of tones are involved, image halftoning is often referred to as multiple level halftoning, or multi-level halftoning, or simply multitoning. In the preferred embodiment of the invention, the term image halftoning includes bi-level halftoning, as well.

As shown in FIGS. 1*a* and 1*b*, calibrated image file IN(x,y) is input to image halftoning unit 110. Calibrated image file IN(x,y) comprises a plurality of pixels with each pixel described by waveform index number IN for each color. As described hereinabove, the waveform index numbers IN are now effectively continuous in nature, which are described in more than 8 bit per pixel per color. The total number of waveform serial numbers, N, corresponding to different optical densities, is in the range $2^1$ to $2^6$, which is much smaller than the total number of waveform index numbers IN. However, simple quantization to the optical densities $D_i$, represented by the waveform serial numbers $SN_i$ produces visible image artifacts on the printed images. Therefore, the function of image halftoning unit 110 is to quantify the calibrated image file IN(x,y) with pixel values described by the waveform index number IN to an image file SN(x,y) with pixel values described by the waveform serial numbers $SN_i$. This is accomplished by spatially modulating adjacent waveform serial numbers $SN_i$ (i.e., image halftoning). These waveform serial numbers SN's are stored in LUT 60.

Figure 5:
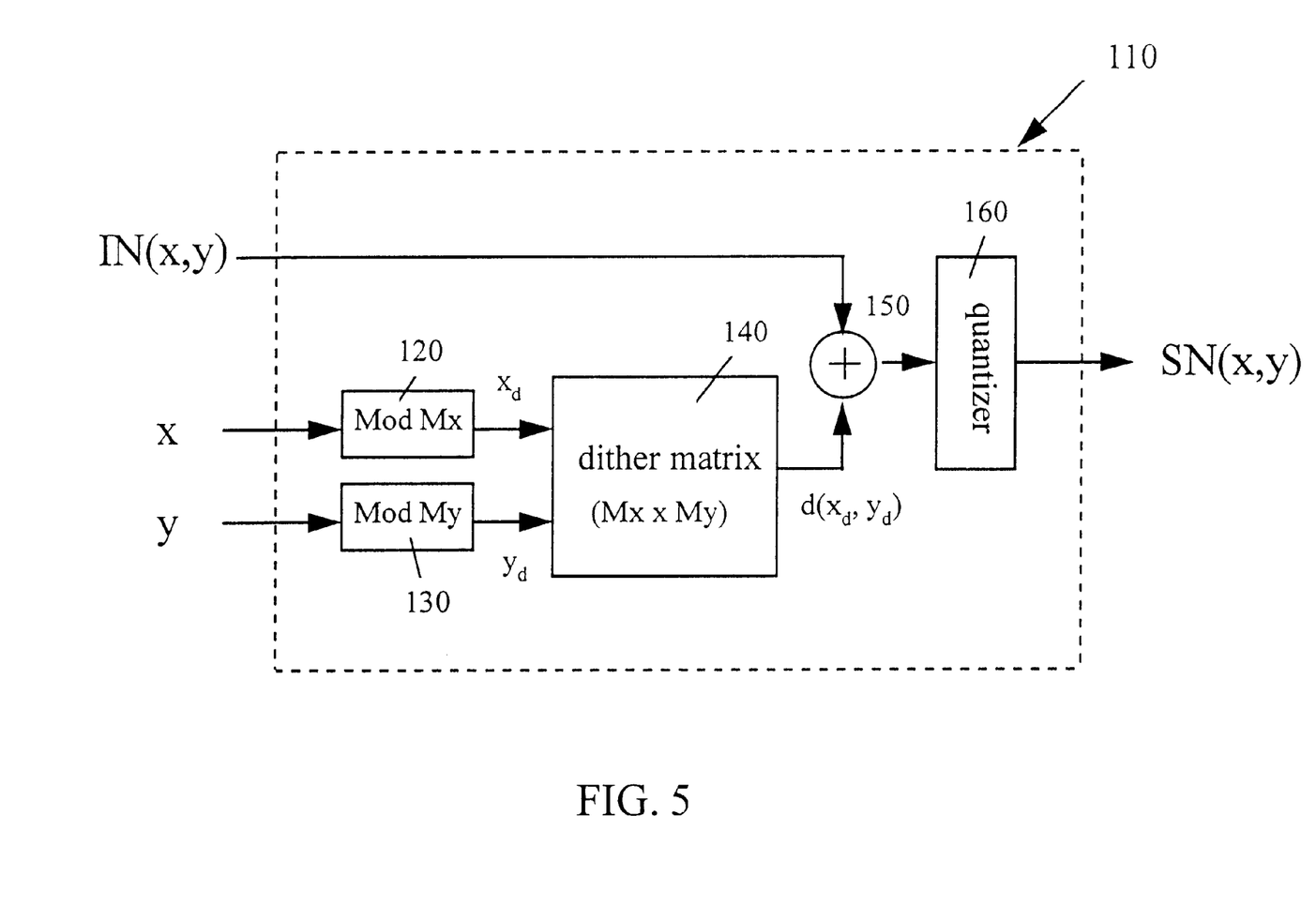
FIG. 5 shows a first embodiment enlargement of the image halftoning device of FIG. 1.

Referring now to FIG. 5, there is illustrated an embodiment of image halftoning unit 110 comprising a suitable halftoning error diffusion algorithm. Alternatively, any of a number of halftoning algorithms well known in the art can be used, such as multilevel ordered dither and multilevel error diffusion. Input image file IN(x,y) is in substantially continuous tone with pixel values described by waveform index numbers (e.g., 8 bits or higher). The column and row address of the input pixels are given by x and y, respectively.

Modulo operator 120 and Modulo operator 130 are used to produce column and row indices $x_d$ and $y_d$, respectively, which are used to address a dither matrix 140 to determine an addressed dither value $d(x_d, Y_d)$. Dither matrix 140 comprises an array of dither values having column and row dimensions $M_x$ and $M_y$, respectively. The dither values stored in the dither matrix 140 may correspond to any of many different types of dither patterns. For example, any one of well-known clustered-dot dither patterns, such as Bayer dither patterns, can be used. Several dither patterns having minimum visibility to a human observer can be used, such as those described in commonly assigned U.S. Pat. Nos. 5,214,517 and 5,586,203, the disclosures of which are hereby incorporated by reference. The addressed dither values $d(x_d, y_d)$ are next added to the input calibrated image file values IN(x,y) using an adder 150 to produce a plurality of modified pixel values. Each modified pixel value is then processed using a quantizer 160 to produce a multitoned pixel value SN(x,y). The halftoning technique disclosed hereinabove is by way of example only because many other halftoning techniques may be used.

Figure 6:
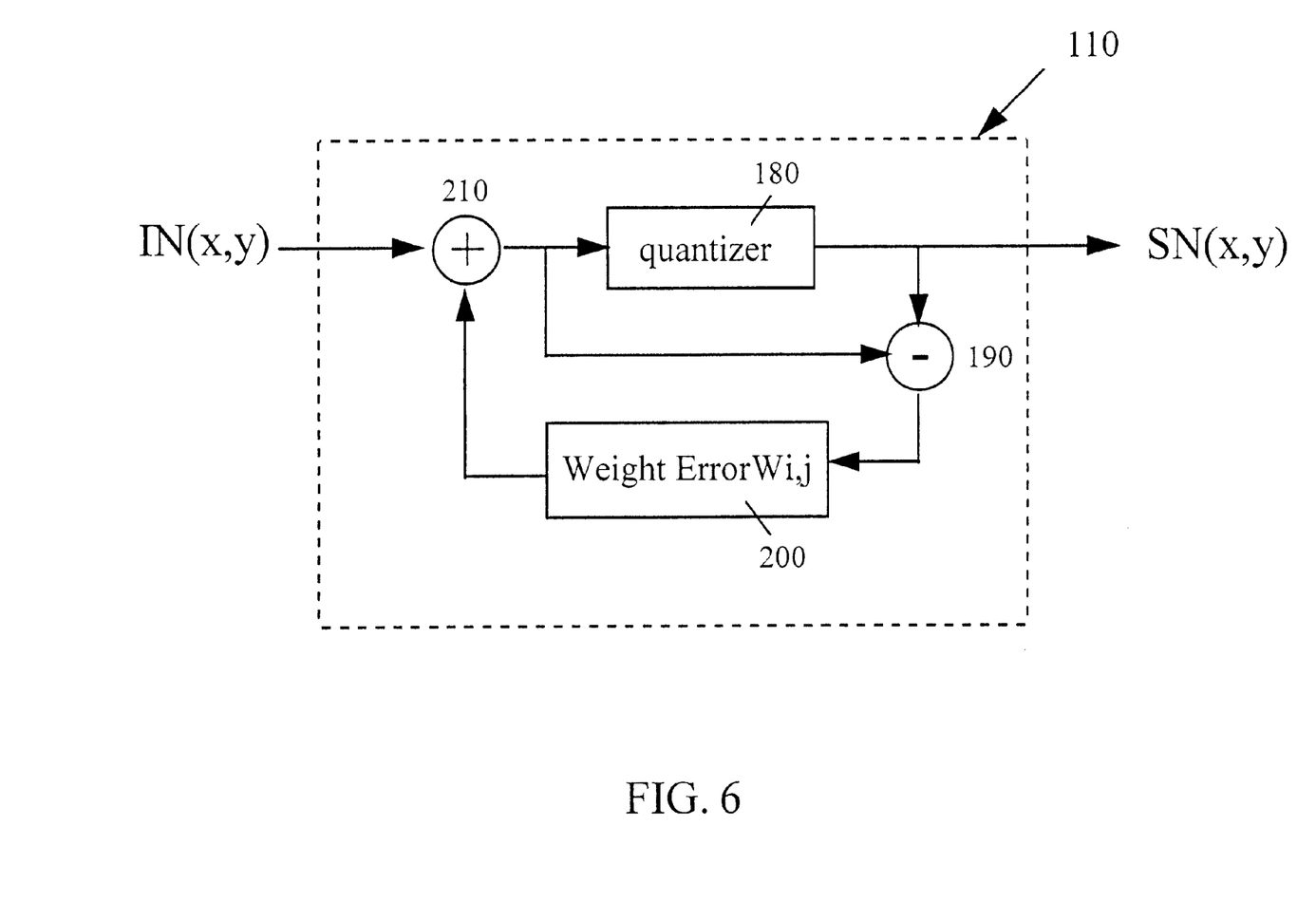
FIG. 6 shows a second embodiment enlargement of the image halftoning device of FIG. 1.

FIG. 6 illustrates another embodiment of image halftoning unit 110 for providing an error diffusion algorithm. Input image file IN(x,y) is in substantially continuous tone with pixel values described by waveform index numbers IN's (in $2^L$ levels). The calibrated image input value IN(x,y) for an input pixel is processed using a quantizer 180 to form a multitoned pixel value SN(x,y). A difference signal generator 190 computes the difference between the calibrated input pixel value IN(x,y) and the multitoned pixel value SN(x,y), thus representing the error introduced by the quantization process. In some cases, it may be desirable to scale either IN(x,y) or SN(x,y) before computing the difference signal provided by difference signal generator 190. The difference signal is next multiplied by a series of error weighting factors, $W_{ij}$, using a weighted error generator 200. The resulting weighted difference signals are provided to an adder 210 which adds the weighted difference signals to the calibrated input values of nearby pixels that have yet to be processed to form modified calibrated input values. The propagation of the errors made during the quantization process to the nearby pixels ensures that the mean of the pixel values is preserved over a local image region. It is understood from the teachings herein that any one of a plurality of error-weight matrices Wij can be used in weighted error generator 200 and the multilevel error diffusion algorithm disclosed hereinabove is only one example of many possible algorithms useable with the present invention. In this regard, examples of such error-weight matrices, $W_{ij}$, are disclosed in "Digital Halftoning", p241, The MIT Press, Cambridge, Mass., by R. Ulichney, 1987.

Returning to FIGS. 1a and 1b, halftoned image file SN(x,y) is next sent to a controller 220. Controller 220 performs the function of controlling the correct waveforms to be generated for corresponding pixels. Controller 220 accomplishes this function by (a) receiving a waveform serial number SN at each pixel and each color of the halftoned image file SN(x,y); (b) looking up the waveform parameters corresponding to the waveform serial number SN at that pixel and color of SN(x,y) using the printer performance LUT 60; (c) sending the waveform parameters to waveform generator 230; and (d) selecting the correct nozzle 45 corresponding to that color and the pixel by sending signals to a nozzle selector 240 that is connected to waveform generator 230. Waveform generator 230 generates correct waveforms in response to the waveform parameters provided by the controller 220 for providing the proper waveforms to actuate an electromechanical transducer 250 or a heat generating element 260 that in turn ejects droplet 47 from ink nozzles 45 in print head 50. That is, ink jet print head 50 may be a piezo-electric ink jet printhead as shown in FIG. 1a. Alternatively, ink jet printhead 50 may be a thermal ink jet printhead comprising a heat generating element 260 disposed in at least one nozzle 45 for generating thermal energy in response to electronic waveforms for ejecting ink droplets 47 from nozzle 45, as shown in FIG. 1b. The waveform generator 230 can include an electric circuit (not shown) for producing the correct digital waveforms in combination with a digital-to-analog converter (not shown), and amplifiers (also not shown). Image-wise activation and ink ejection of ink droplets 47 reproduces the input digital image on receiver 30.

An advantage of the present invention is that noise is reduced. This is so because pixel values in the image files are converted into calibrated waveform index numbers which define electronic waveforms for controlling the print head and that the dithering or image halftoning is conducted on the calibrated image files. Thus, the pixel values of the output from dither matrix 140 are described as waveform serial numbers that can be used directly for controlling the ink jet print head. That is, since no additional calibration is performed after halftoning, the introduction of additional noise is avoided.

Another advantage of the present invention is that printing time is reduced. This is so because the number of printing passes needed for each image area is reduced.

The invention has been described in detail with particular reference to certain preferred embodiments thereof, but it will be understood that variations and modifications can be effected within the spirit and scope of the invention. For example, the present invention is compatible with an ink-jet printer apparatus using inks of different densities for each color. As another example, the present invention can also incorporate printing modes such as printing a plurality of ink droplets at each image location on a receiver medium in one or more passes.

Therefore, what is provided is a digital ink jet printing apparatus and method for variable gray scales printing on a receiver medium in such a manner that "quantization errors", visible noise, excessive ink laydown and printing time are reduced.

The invention has been described in detail with particular reference to certain preferred embodiments thereof, but it will be understood that variations and modifications can be effected within the spirit and scope of the invention.

PARTS LIST

10. . . system block diagram
20. . . electronic memory
30. . . receiver medium
40. . . image processor
45. . . nozzle
46. . . ink chamber
47. . . ink droplet
50. . . inkjet print head
60. . . printer performance look-table
70. . . image calibrator
80. . . waveform
90. . . group of square pulses
100. . printer performance curve
110. . image halftoning unit
120. . Modulo operator "x"
130. . Modulo operator "y"

140. . dither matrix
150. . adder (first embodiment)
160. . quantizer (first embodiment)
180. . quantizer (second embodiment)
190. . difference signal generator
200. . error weighting generator
210. . adder (second embodiment)
220. . controller
230. . waveform generator
240. . nozzle selector
250. . electromechanical transducer
260. . heater element

What is claimed is:

1. An ink jet printing apparatus for printing an image on a receiver medium in response to an input image file having a plurality of pixels, each pixel described by at least one pixel value associated with an optical density, comprising:

(a) a printhead;
   (b) at least one nozzle integrally attached to said printhead, said at least one nozzle capable of ejecting an ink droplet associated with the optical density;
   (c) a waveform generator associated with said at least one nozzle for generating a plurality of electronic waveforms to be supplied to said at least one nozzle, so that said at least one nozzle ejects the ink droplet in response to each electronic waveform supplied thereto, each electronic waveform being defined by a plurality of pulses;
   (d) a look-up table associated with said waveform generator for storing a plurality of waveform serial numbers assigned to respective electronic waveforms, each electronic waveform being defined by a predetermined waveform parameter; and
   (e) a calibrator for receiving the input image file and for converting the pixel values of the input image file to a plurality of waveform index numbers associated with respective ones of the waveform serial numbers so as to provide a calibrated image file.

2. The apparatus of claim 1, wherein the plurality of waveform serial numbers stored in said look-up table are associated with optical densities of the ink droplet produced by said at least one nozzle in response to the electronic waveforms.

3. The apparatus of claim 1, further comprising an image halftoning unit connected to said calibrator for halftoning the calibrated image file to generate a halftoned image file having a plurality of pixel values defined by the waveform serial numbers.

4. The apparatus of claim 3, further comprising a controller coupled to said look-up table for generating the waveform parameter which is received by said waveform generator according to a corresponding one of the waveform serial numbers provided by said image halftoning unit.

5. The apparatus of claim 1, further comprising a nozzle selector interconnecting said waveform generator and said printhead for selecting said at least one nozzle for actuation.

6. The apparatus of claim 1, further comprising an electromechanical transducer disposed in said at least one nozzle and responsive to the electronic waveform for ejecting the ink droplet from said at least one nozzle.

7. The apparatus of claim 6, wherein said electromechanical transducer is formed of a piezoelectric material.

8. The apparatus of claim 1, wherein said look-up table comprises a plurality of the predetermined waveform parameters including a number of pulses, a pulse amplitude, a pulse width and a time delay between the pulses for respective ones of the electronic waveforms.

9. The apparatus of claim 1, further comprising a heat generating element in said at least one nozzle for generating thermal energy responsive to the electronic waveform for ejecting the ink droplet from said at least one nozzle.

10. The apparatus of claim 8, wherein the time delay between the pulses is zero.

11. The apparatus of claim 1, wherein the electronic waveform is defined by a plurality of spaced-apart groups of the pulses.

12. An ink jet printing apparatus for variable gray-scale printing an output image on a receiver medium in response to an input image file having a plurality of pixels, each pixel described by at least one pixel value associated with an optical density, comprising:

(a) a printhead;
   (b) a plurality of nozzles integrally attached to said printhead, each of said nozzles capable of ejecting a plurality of ink droplets therefrom associated with the optical density;
   (c) a waveform generator associated with said nozzles for generating a plurality of electronic waveforms to be supplied to said nozzles, so that said nozzles eject the ink droplets in response to each electronic waveform supplied thereto, each electronic waveform being defined by a plurality of pulses;
   (d) a look-up table associated with said waveform generator for storing a plurality of waveform serial numbers assigned to respective electronic waveforms, each electronic waveform being defined by a predetermined parameter;
   (e) a calibrator for receiving the input image file and for converting the pixel values of the input image file to a plurality of waveform index numbers associated with respective ones of the waveform serial numbers so as to provide a calibrated image file;
   (f) an image halftoning unit connected to said calibrator for halftoning the calibrated image file to generate a halftoned image file having a plurality of pixel values defined by the waveform serial numbers;
   (g) a controller coupled to said look-up table for generating the at least one waveform parameter which is received by said waveform generator according to waveform serial numbers provided by said image halftoning unit;
   (h) a nozzle selector interconnecting said waveform generator and said printhead for selecting a predetermined nozzle from said plurality of nozzles for actuation; and
   (i) a piezoelectric electromechanical transducer disposed in at least one of said nozzles and responsive to said electronic waveforms for ejecting the ink droplets from said nozzles.

13. The apparatus of claim 12, wherein said look-up table comprises a plurality of the predetermined waveform parameters including a number of pulses, a pulse amplitude, a pulse width and a time delay between the pulses for respective electronic waveforms.

14. The apparatus of claim 12, wherein the time delay between the pulses is zero.

15. The apparatus of claim 12, wherein each electronic waveform is defined by a plurality of spaced-apart groups of pulses.

16. A method of ink jet printing for variable gray-scale printing on a receiver medium in response to an input image file having a plurality of pixels, each pixel described by at least one pixel value associated with an optical density, comprising the steps of:

(a) providing a printhead;

(b) providing at least one nozzle integrally attached to said printhead, said at least one nozzle capable of ejecting an ink droplet associated with the optical density;

(c) providing a waveform generator associated with the at least one nozzle and generating a plurality of electronic waveforms that are supplied to the at least one nozzle, so that the at least one nozzle ejects the ink droplet in response to each electronic waveform supplied thereto, the electronic waveform being defined by a plurality of pulses;

(d) providing a look-up table associated with the waveform generator and storing a plurality of waveform serial numbers assigned to respective electronic waveforms, each electronic waveform being defined by a predetermined waveform parameter; and (e) providing a calibrator for receiving the input image file and converting the pixel values of the input image file to a plurality of waveform index numbers associated with the waveform serial numbers so as to provide a calibrated image file.

17. The method of claim 16, wherein said step of providing a look-up table comprises the step of providing the plurality of waveforms in the look-up table, the plurality of waveforms being associated with optical density of the ink droplet produced by the at least one nozzle in response to the waveforms.

18. The method of claim 16, further comprising the step of providing an image halftoning unit connected to the calibrator for halftoning the calibrated image file and generating a halftoned image file having a plurality of pixel values defined by the waveform serial numbers.

19. The method of claim 16, further comprising the step of providing a nozzle selector interconnecting the waveform generator and the printhead and selecting the at least one nozzle for actuation.

20. The method of claim 18, further comprising the step of providing a controller connected to the look-up table and generating the waveform parameter which is received by waveform generator according to waveform serial numbers provided by the image halftoning unit.

21. The method of claim 16, further comprising the step of providing an electromechanical transducer disposed in the at least one nozzle and in response to the electronic waveform ejecting the ink droplet from the at least one nozzle.

22. The method of claim 21, wherein said step of providing an electromechanical transducer comprises the step of providing the electromechanical transducer formed of a piezoelectric material.

23. The method of claim 16, further comprising the step of providing a heat generating element in the at least one nozzle and generating thermal energy responsive to the electronic waveform for ejecting the ink droplet from the at least one nozzle.

24. The method of claim 16, wherein said step of providing a look-up table comprises the step of providing the look-up table having a plurality of the predetermined waveform parameters including a number of pulses, a pulse amplitude, a pulse width and a time delay between the pulses for respective ones of the electronic waveforms.

25. The method of claim 23, wherein said step of providing a look-up table having the predetermined waveform parameters comprises the step of providing the look-up table having the plurality of pulses with a time delay between the plurality pulses equal to zero.

26. The method of claim 16, wherein said step of providing a waveform generator comprises the step of generating the electronic waveform defined by a plurality of spaced-apart groups of pulses.

27. An ink jet printing method of variable gray-scale printing an output image on a receiver medium in response to an input image file having a plurality of pixels, each pixel described by at least one pixel value associated with an optical density, comprising the steps of:

(a) providing a printhead;

(b) providing a plurality of nozzles integrally attached to the printhead, each of the nozzles capable of ejecting a plurality of ink droplets therefrom associated with the optical density;

(c) providing a waveform generator associated with the nozzles and generating a plurality of electronic waveforms that are supplied to the nozzles, so that the nozzles eject the ink droplets in response to each electronic waveform supplied thereto, each electronic waveform being defined by a plurality of pulses;

(d) providing a look-up table associated with the waveform generator and storing a plurality of waveform serial numbers assigned to respective electronic waveforms, each electronic waveform being defined by a predetermined waveform parameter;

(e) providing a calibrator for receiving the input image file and converting the pixel values of the input image file to a plurality of waveform index numbers associated with respective ones of the waveform serial numbers so as to define a calibrated image file;

(f) providing an image halftoning unit connected to the calibrator for halftoning the calibrated image file and generating a halftoned image file having a plurality of pixel values defined by the waveform serial numbers;

(g) providing a controller coupled to the look-up table and generating the waveform parameter for the waveform generator according to waveform serial numbers provided by the image halftoning unit;

(h) providing a nozzle selector interconnecting the waveform generator and the printhead and selecting a predetermined nozzle from the plurality of nozzles for actuation; and (i) providing a piezoelectric electromechanical transducer disposed in at least one of said nozzles and in response to the electronic waveforms ejecting the ink droplets from the nozzles.

28. The method of claim 27, wherein the step of providing a look-up table comprises the step of providing the look-up table having a plurality of the predetermined waveform parameters including a number of pulses, a pulse amplitude, a pulse width and a time delay between the pulses for respective electronic waveforms.

29. The method of claim 28, wherein said step of providing a look-up table having a plurality of the predetermined waveform parameters comprises the step of providing the look-up table having the plurality of pulses with a time delay between the plurality of pulses equal to zero.

30. The method of claim 28, wherein said step of providing a waveform generator comprises the step of providing the waveform generator for generating the electronic waveforms each defined by a plurality of spaced-apart groups of pulses.

* * * * *